United States Patent [19]

Barroyer

[11] Patent Number: 4,741,624

[45] Date of Patent: May 3, 1988

[54] DEVICE FOR PUTTING IN CONTACT FLUIDS APPEARING IN THE FORM OF DIFFERENT PHASES

[75] Inventor: Bernard Barroyer, Plan D'Orgon, France

[73] Assignee: OMYA, S. A., Paris, France

[21] Appl. No.: 911,437

[22] Filed: Sep. 25, 1986

[30] Foreign Application Priority Data

Sep. 27, 1985 [FR] France .................................. 85 14566

[51] Int. Cl.$^4$ ............................................. B01F 15/02
[52] U.S. Cl. .................................... 366/165; 261/79.2; 366/149
[58] Field of Search ............... 366/150, 165, 178, 144, 366/149, 167, 172, 179, 181; 261/79.2

[56] References Cited

U.S. PATENT DOCUMENTS

| | | | |
|---|---|---|---|
| 3,207,485 | 9/1965 | Warren | 366/165 |
| 3,794,299 | 2/1974 | Wagner | 366/165 |
| 4,370,304 | 1/1983 | Hendriks | 261/79.2 |
| 4,390,284 | 6/1983 | Hyde | 366/165 |

Primary Examiner—Robert W. Jenkins
Attorney, Agent, or Firm—Oblon, Fisher, Spivak, McClelland & Maier

[57] ABSTRACT

Device for putting in contact fluids appearing in the form of different phases at least one of which is in hot and gaseous form comprising an outer envelope of revolution (1) provided in its upper part with an upper floor (2) and in its lower part with a convergent-divergent nozzle (5) defining a narrow passage (6) in which the hot, gas phase circulates driven with a helical movement. The downstream end of a feed pipe (7) of one of the other phases appearing in the liquid or pasty state or in the form of a suspension comes out axially. To release all the thermal stresses of the envelope (1) and of the upper floor (2) and to maintain the downstream end of the feed pipe (7) in its initial adjustment position in relation to the axis and to the plane of the narrow passage (6), the upstream end of the feed pipe is separated from the outer envelope of revolution (1) by an elastic, fluidtight means able to absorb expansions due to the differences of temperature between the feed (7) and the pipe and envelope (1).

13 Claims, 4 Drawing Sheets

DEVICE FOR PUTTING IN CONTACT FLUIDS APPEARING IN THE FORM OF DIFFERENT PHASES

FIELD OF THE INVENTION

The invention relates to a device for putting in contact fluids at least one of which appears in the form of a gas phase.

In particular, the invention relates to the treatment by a gas at high temperature of products in liquid form, having or not having solid materials in suspension.

BACKGROUND OF THE INVENTION

Putting in contact various fluids with one another, appearing in the form of at least one hot and gas phase, and of liquid phases, semiliquid phases or pasty phases containing or not containing solid materials in suspension, has raised numerous difficulties for the art for a long time. This problem is encountered in a good number of applications, such as, for example, the treatment of waste acids, residual waters or also the drying of solid materials in suspension in a liquid phase. In any case, the treatment consists in subjecting the liquid or the suspension to the action of a gas brought to high temperature, such as combustion fumes or hot air, so that by the twin action of a heat transfer and a mass transfer, there would be a reaction between the gas phase or phases and the liquid phase resulting in the evaporation or the decomposition of the liquid and a separation of the solid particles which can thus be recovered after a modification of their surface state. Carrying out of such a treatment necessitates the achievement of as thorough a contact as possible between the various phases present so as to achieve a heat transfer from the hot and gas phase to the liquid phase with maximum efficiency.

Various devices have been proposed to achieve this. In particular, in French Patent No. 2 257 326 a process has been described for putting in contact substances appearing in different phases, one being gas, the other to be dispersed such as a liquid, solution or suspension. This process consists in:
 imparting to the gas phase a swirling helical movement before this phase is mixed with the liquid phase to be dispersed,
 feeding the liquid phase into a rectilinear current coaxial with the axis of symmetry of the gas phase,
 imparting to this gas phase a quantity of movement much greater than that of the liquid phase to be dispersed, sufficient to cause at the point of impact, at the same time, the dispersion of this phase and its takeover by the gas phase.

Thus, a contact as thorough as possible is obtained facilitating the reaction between the two phases.

The treatment is of the flash type and can be accompanied by a high difference in temperature between the two phases.

In this same patent, the means are described and claimed that are to be put into practice to obtain a contacting of the substances.

The proposed device comprises first of all an outer envelope of revolution ending at its lower part with a tapered element whose small base constitutes a circular opening of narrow section and comprising at the upper part a fluidtight wall providing passage to a feed pipe coaxial with the envelope and which is solid with it. The downstream end of this pipe comes out at a distance from the mean plane of the circular opening between 0 and the radius of this opening, the outer section of the inner piping being at most one-fourth of the section of the opening of narrow section.

The proposed device further comprises a means for feeding into the envelope around the coaxial pipe the gas phase to be put in contact, imparting to it a helical movement symmetrical in relation to the axis merged with the feed pipe and with the envelope as well as a container placed contiguously downstream from the envelope constituting a chamber for separation of the phases. The upper part of this container is in the shape of a divergent cone connected by its vertex to the circular opening and its axis of revolution is merged with that of the outer envelope.

In this device, the gaseous fluid in helical movement has its speed grow as it flows in the tapered space delimited by the lower part of the outer envelope and by the feed pipe. This speed is maximal in the vicinity of the passage of the circular opening.

It then gives rise beyond the mouth of this opening to a group of paths distributed along a hyperboloid whose axis is merged with that of the opening. These paths diverge until encountering the walls of the downstream container on which they again generate a pseudohelical movement of rotation. The group consisting the convergent-shaped outlet of the outer envelope of revolution and the divergent high part of the container has the shape of a pipe.

Different variants were conceived afterwards to the device described in French Patent No. 2 257 326 to increase the effectiveness of the contact between the phases and to adapt the operation of the device either to the treatment of hot fluids, or even to a combustion process.

In particular, the application of the process in the case of a combustion is described in French Patent No. 2 276 086.

The fuel substance can enter into the reaction chamber in the gas or liquid state and constitutes the axial rectilinear current. The helical current can consist of gases able to react with the axial rectilinear current. In the case of a combustion, this gas is advantageously air.

The flow and the distribution of the paths of the helical gas current are such that a depression is created in the axial zone of this current at the mouth of the circular opening. This depression has the effect of causing a suction of the axial rectilinear current of the fuel, which has the advantage, while facilitating the mixture of the phases, of limiting the pressure necessary for the injection of this fuel.

The ignition of this fuel is provided by a standard device such as a spark plug between the electrodes from which a spark discharges.

Also, thanks to French Patent No. 2 404 173, a variant of the same device is known comprising coaxially an upstream chamber for flame generation and a downstream (combustion) chamber, the chambers communicating with one another by a narrow zone consisting, for example, of a covergence zone followed by a cylindrical part forming a neck.

In the first upstream chamber for flame generation, a symmetrical "vortex sink" flow with an oxygen-carrying gas is created, a fuel fluid is fed along an axial symmetry, and the formation of a flame is caused.

In the second downstream chamber, a gas phase to be treated is fed into the flame coming from the first zone, the gas phase being able to consist of thermodegradable combustible materials chemically transforming under the action of heat.

Finally, in French Patent No. 2 431 321, an improved device is known in which a combustion is performed in a reaction chamber having at its downstream end a convergent-divergent nozzle, whose smallest section constitutes a narrow passage. A current of hot fumes is generated circulating in a symmetrical helical movement through the narrow passage and fed through a suitable pipe into the partial vacuum zone of the "vortex sink" flow created by the current of fumes, along its axis of symmetry, a liquid, semiliquid or pasty phase.

The feed pipe of the liquid, semiliquid or pasty phase comes out at the height of the narrow space in the axis of revolution of the outer envelope.

The operational effectiveness of such devices intended to put in contact at least two phases one of which is gaseous and hot is governed by numerous parameters, one of the most important of which consists in obtaining a perfect mixture of the liquid, semiliquid or pasty phase fed with the gas phase in movement. This implies that the gas phase exhibits at the point of impact with the liquid phase a sufficient kinetic moment to cause a dispersion of fine droplets of liquid in the gas volume and their takeover by this gas according to a homogeneous distribution, a corresponding volume of fumes being associated with each droplet.

This result can be obtained only on condition that:
the gas flow near its impact with the liquid phase has a perfect symmetry around its axis of revolution, and
the position of this impact in the vicinity of the narrow space is geometrically well defined in the space and remains unaffected by the temperature differences.

In particular, this involves a precise execution of the convergent-divergent nozzle and a strict geometric positioning of the mouth of the feed pipe of the liquid phase in relation to the throat defined by the convergent-divergent nozzle.

Now, in the case of treatments such as, for example, drying or reactions putting into play various phases at least one of which is fed or brought to high temperature, the mechanical behavior of the elements of the device subjected to high temperatures, for example greater than 400° C., is generally affected by stresses due to temperature. If, in a more precise way, there is made to circulate in the outer envelope of revolution a hot gas phase (combustion fumes or hot air) at a temperature at least equal to that previously cited, and the feed pipe is supplied with a liquid, semiliquid or pasty phase at a temperature clearly lower that that of the gas phase, the expansion of the outer envelope causes, as the applicant has been able to establish, a movement of the feed pipe which is solid with it, and particularly of its mouth in relation to the axis and to the plane of the throat of the convergent-divergent nozzle.

Consequently, there have been major drawbacks such as:
first, a poor symmetry of the "vortex sink" flow and the movement of the impact zone between the gas-liquid (semiliquid or pasty) phases, causing a reduction in the effectiveness of the mixture between the phases,
then the direct interception of a part of the liquid jet by the walls of the outlet divergent with, and because of the temperature prevailing on the walls of the chamber, a progressive formation of deposits coming either from the decomposition of the liquid or from the precipitation of the solids carried in the suspension,
finally, the occlusion of the chamber for separation of the phases, a result of the gradual and irregular feeding of its wall which in turn causes an accentuation of the lack of balance of the flow at right angles with and at the outlet of the throat.

Consequently, it has proven essential to avoid, under the action of high temperatures, there being able to be loss of adjustment of the position of the mouth of the feed pipe in relation to the throat of the convergent-divergent nozzle. For this reason, the applicant, pursuing his research in this field, studied and developed an improvement of the devices of the prior art so as to avoid those drawbacks, these improved devices being intended to put in contact fluids appearing in the form of various phases at least one of which in helical movement is in gaseous and hot form.

SUMMARY OF THE INVENTION

The improved device according to the invention comprises an outer envelope of revolution, provided in its upper part with a floor and in its lower part with a convergent-divergent nozzle defining a narrow passage in which the gas and hot phase circulates driven with a helical movement. The downstream end of a feed pipe of one of the other phases appearing in the liquid state, the pasty state, or in the form of suspension comes out axially. To release all the thermal stresses of the envelope of revolution and of the upper floor and to maintain the downstream end, still called mouth, of the feed pipe in its initial adjustment position in relation to the axis and to the plane of the narrow passage, the upstream end of the pipe is separated from the outer envelope of revolution by an elastic, fluidtight means able to absorb expansions due to the differences of temperature between pipe and envelope.

This means according to the invention first prevents any deformation of the outer envelope of revolution resulting from a thermal expansion of the envelope from causing a movement of the feed pipe which, in the embodiments described in the prior art, were entirely solid with it.

Also, this means provides a fluidtightness at the level of the connection between the feed pipe and the outer envelope of revolution by preventing any exit to the outside of gases or fumes fed into this envelope.

The fluidtight and elastic means can be made using a bellows, preferably metal, having a certain number of convolutions absorbing the deformations of the outer envelope in the vicinity of its connection with the feed pipe.

It can also be made using a telescopic unit such as, for example, a stiffing box, provided with springs and fluidtight fittings placed between the various sliding elements of this unit comparable to those that are used on fluidtight devices of rotating shafts.

In this latter case, the means providing the fluidtightness is designed so as to accept simultaneously an axial movement and a slight radial movement.

The fluidtight fittings can, in general, be made from all materials known to the art, fulfilling this function in a gaseous and hot medium, such as, for example, graphite rings, impregnated mineral fibers . . . , but advantageously these fluidtightness fittings can consist of asbestos-twine resistant to high temperatures.

The assembly of the lower end of the elastic, fluidtight means able to absorb expansion and of the outer envelope of revolution is made using intermediate parts such as flanges provided with seals intend to prevent any passage of gas or fumes between the lower end of the means and envelope.

In the same way, the upper end of the means is made solid with the feed pipe using intermediate parts such as flanges provided with fluidtight seals also preventing any passage of gas or fumes between the upper end of the means and the feed pipe.

According to an embodiment of this invention and so that the position of the mouth of the feed pipe in relation to the axis and to the plane of the throat of the convergent-divergent nozzle is not affected by deformation deviations between the feed pipe and the outer envelope due to the action of temperature, the separation of the pipe and the envelope of revolution is completed by means able to maintain said positioning in its initial adjustment.

For this purpose and to constitute a first stationary point, the convergent-divergent nozzle, at the height of its throat, is made solid with a rigid outer structure supporting the device.

On the outside of the envelope of revolution, and to constitute a second stationary point, the upstream end of the feed pipe is also made solid with the throat of the convergent-divergent nozzle, by the structure.

In this way, the upstream end of the feed pipe and the throat of the convergent-divergent nozzle constitute two stationary points of the device, associated and made rigid in relation to one another and insensitive to the effects of temperature. Therefore, these two stationary points provide the hold of the feed pipe in its initial adjustment position in relation to the axis and to the plane of the throat.

The outer connecting structure can have the appearance of a bracket or of a gantry and can be made, for example, using a steel frame construction or a concrete work which, advantageously, supports the device.

The fastening of the throat of the convergent-divergent nozzle and of the upstream end of the feed pipe to this structure is performed using parts, such as, for example, shims or jackscrews, making possible a precise adjustment of the positioning of the feed pipe and of the throat of the convergent-divergent nozzle during the initial mounting.

But it is necessary, to keep this adjustment hot, that the feed pipe, separated from the outer envelope of revolution and made solid with the throat of the convergent-divergent nozzle by its upstream end, not be deformed under the action of the temperature to which it is exposed. For this purpose, and according to the same embodiment of this invention, the feed pipe is provided over its entire length with an outer cooling means providing, during operation, its being kept at a temperature sufficiently low to avoid any expansion of this pipe and consequently any modification in the adjustment of its positioning.

The cooling can be performed, for example, using a tube concentric to the feed pipe in which a circulation of a cooling fluid is provided.

But it is possible that the entrance of the feed pipe is positioned on the outer envelope of revolution, not in the axis of this envelope, but laterally, the mouth of the pipe remaining coaxial with the envelope. This envelope exhibits in this latter case over all or part of its length a shape no longer rectilinear but curved. It is then difficult to made a cooling jacket using a tube in a single concentric element fitting the shape of the feed pipe over its entire length. Advantageously, one is led to make this jacket either, for example, using tubular elements of short length slipped on the feed pipe and assembled by welding so as to constitute a continuous envelope, or further using metal bellows easily fitting the curvature of the pipe, or further of a small-diameter tube wound in contiguous spirals on the pipe, the cooling liquid circulating inside this tube.

BRIEF DESCRIPTION OF THE DRAWINGS

This invention will be better understood using the following diagrams and examples which are given by way of illustration without thereby being limiting.

DETAILED DESCRIPTION OF THE PRESENTLY PREFERRED EMBODIMENTS

The First Embodiment

Figure 1:
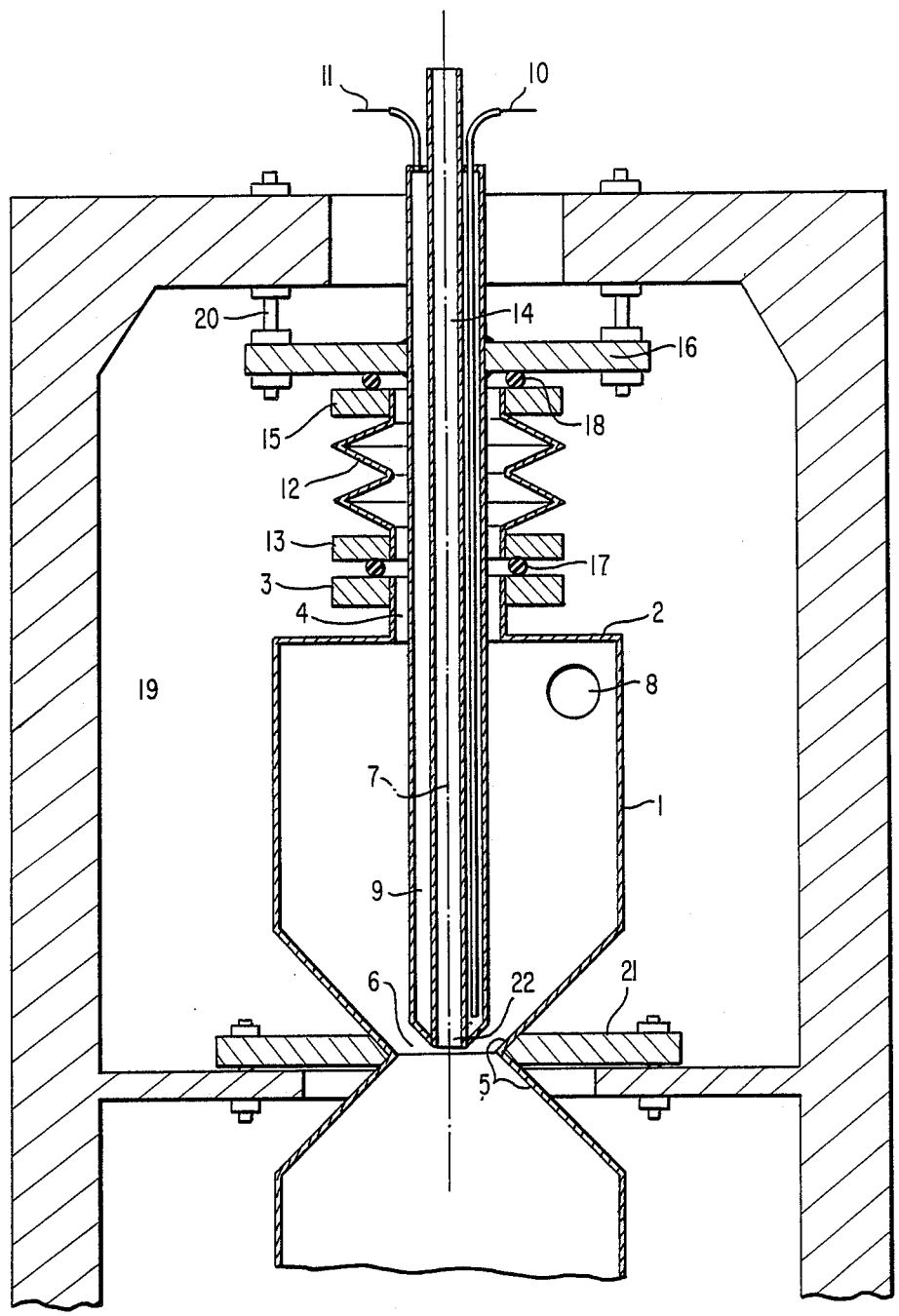
FIG. 1 is a vertical and axial section of a first embodiment of the device according to the invention whose feed pipe is coaxial with the outer envelope of revolution and whose elastic, fluidtight means able to absorb expansions is a metal bellows.

According to FIG. 1, the device is composed of an outer envelope of revolution (1), provided in its upper part with an upper floor (2), comprising a flange (3) and a recessed space (4) and, in its lower part, with a convergent-divergent nozzle (5) delimiting a narrow passage (6) in which a feed pipe (7) having a mouth (22) comes out going through the recessed space (4). The outer envelope of revolution comprises a pipe (8) for feeding the hot gas phase.

The feed pipe (7) comprises a cooling jacket (9) in which a cooling fluid circulates fed by a pipe (10) and exiting by a pipe (11).

The device also comprises an elastic, fluidtight means able to absorb expansions, consisting of a bellows (12) made solid with the upper floor (2) by a flange (13) and with the upstream part (14) of the feed pipe (7) by a flange (15). The flange (15) is fastened to a flange ring (16) of the cooling jacket (9), and the flange ring (16) is solid with the feed pipe (7).

The fluidtightness between the bellows (12), the flange (3), and the flange ring (16) is provided by seals (17) and (18).

The flange ring (16) fastened to the cooling jacket (9) is made solid with an outer connecting structure (19) by jackscrews (20) making it possible to position the feed pipe (7).

The convergent-divergent nozzle (5), at the height of the narrow passage (6), is made solid with the outer connecting structure (19) by a flange ring (21).

In this way, the position of the mouth (22) of the feed pipe (7) is easily adjusted in relation to the axis and to the plane of the narrow passage (6) and rigorously maintained regardless of the operating conditions of the device.

The Second Embodiment

Figure 2:
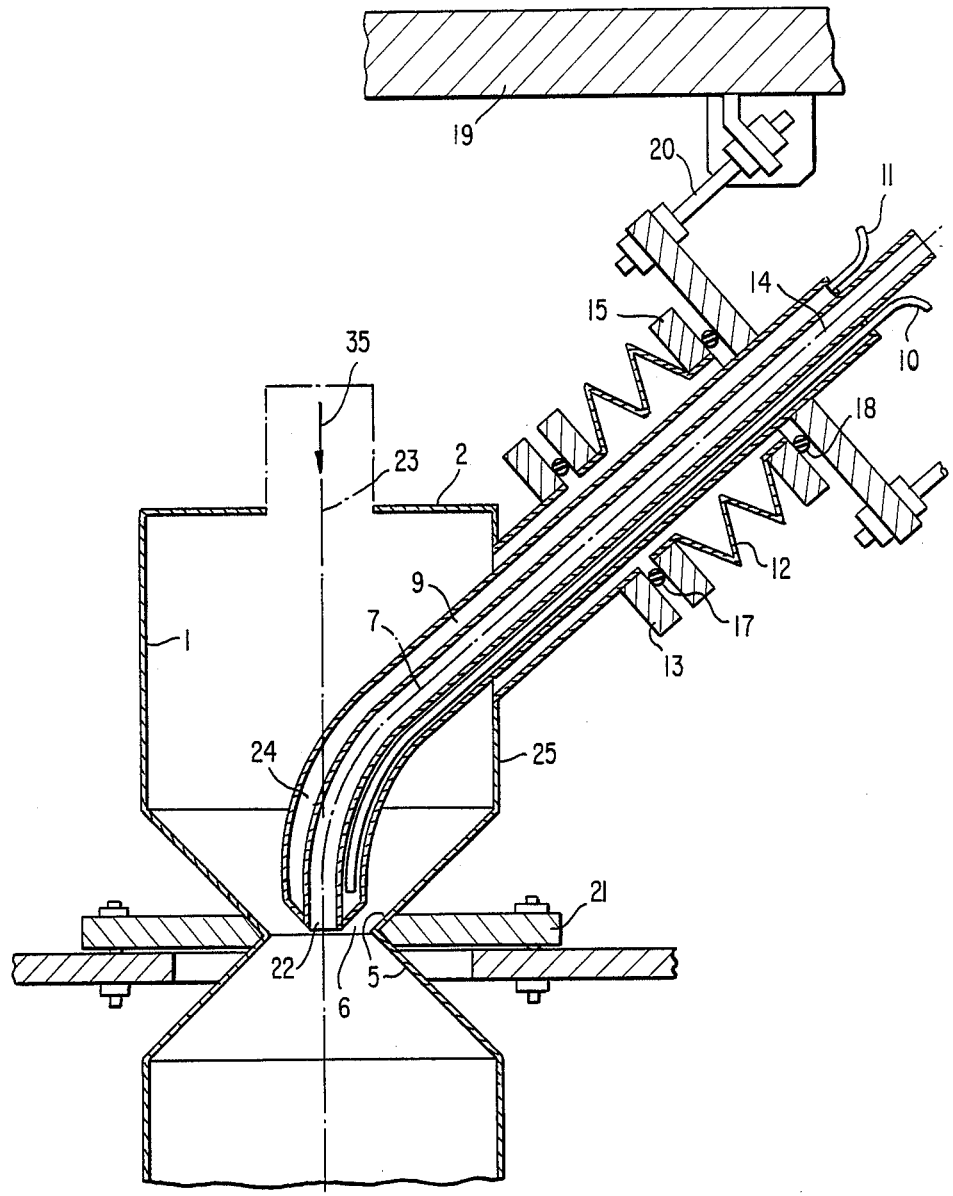
FIG. 2 is a vertical and axial section of a second embodiment of the device whose feed pipe is positioned laterally on the outer envelope of revolution, the mouth of the pipe being coaxial with the envelope and whose elastic, fluidtight means able to absorb expansions is a metal bellows.

According to FIG. 2, the device is composed of an outer envelope of revolution (1), provided in its upper part with an upper floor (2) comprising an opening (23) making possible the coaxial introduction along an arrow (35) of the hot gas phase driven with a helical movement coming from a generator (not shown) of fumes or of hot air and, in its lower part, from a convergent-divergent nozzle (5) delimiting a narrow passage (6) in which a feed pipe (7) having a mouth comes out.

The feed pipe (7), of partially curved shape, comprises a cooling jacket (9) extended in a curved part (24) up to the mouth (22) of the feed pipe. Inside the cooling jacket (9), a cooling fluid circulates fed by a pipe (10) and leaving by a pipe (11).

In addition, the device comprises an elastic, fluidtight means able to absorb expansions, consisting of a bellows (12), made solid with a lateral wall (25) of the envelope of revolution (1) by a flange (13) and with the upstream part (14) of the feed pipe (7) by a flange (15). The flange (15) is fastened to a flange ring (16) of the cooling jacket (9), and the flange ring (16) is solid with the feed pipe (7).

The fluidtightness between the bellows (12), the flange (13), and the flange ring (16) is provided by seals (17) and (18).

The flange ring (16), fastened to the cooling jacket (9), is made solid with an outer connecting structure (19) by jackscrews (20) making possible the adjustment—positioning—of the feed pipe (7).

The convergent-divergent nozzle (5), at the height of the narrow passage (6), is also made solid with the outer structure (19) by a flange ring (21).

In this way, the position of the mouth (22) of the feed pipe (7) is easily adjusted in relation to the axis and to the plane of the narrow pasasge (6) and maintained in this position regardless of the operating conditions of the device.

The Third Embodiment

Figure 3:
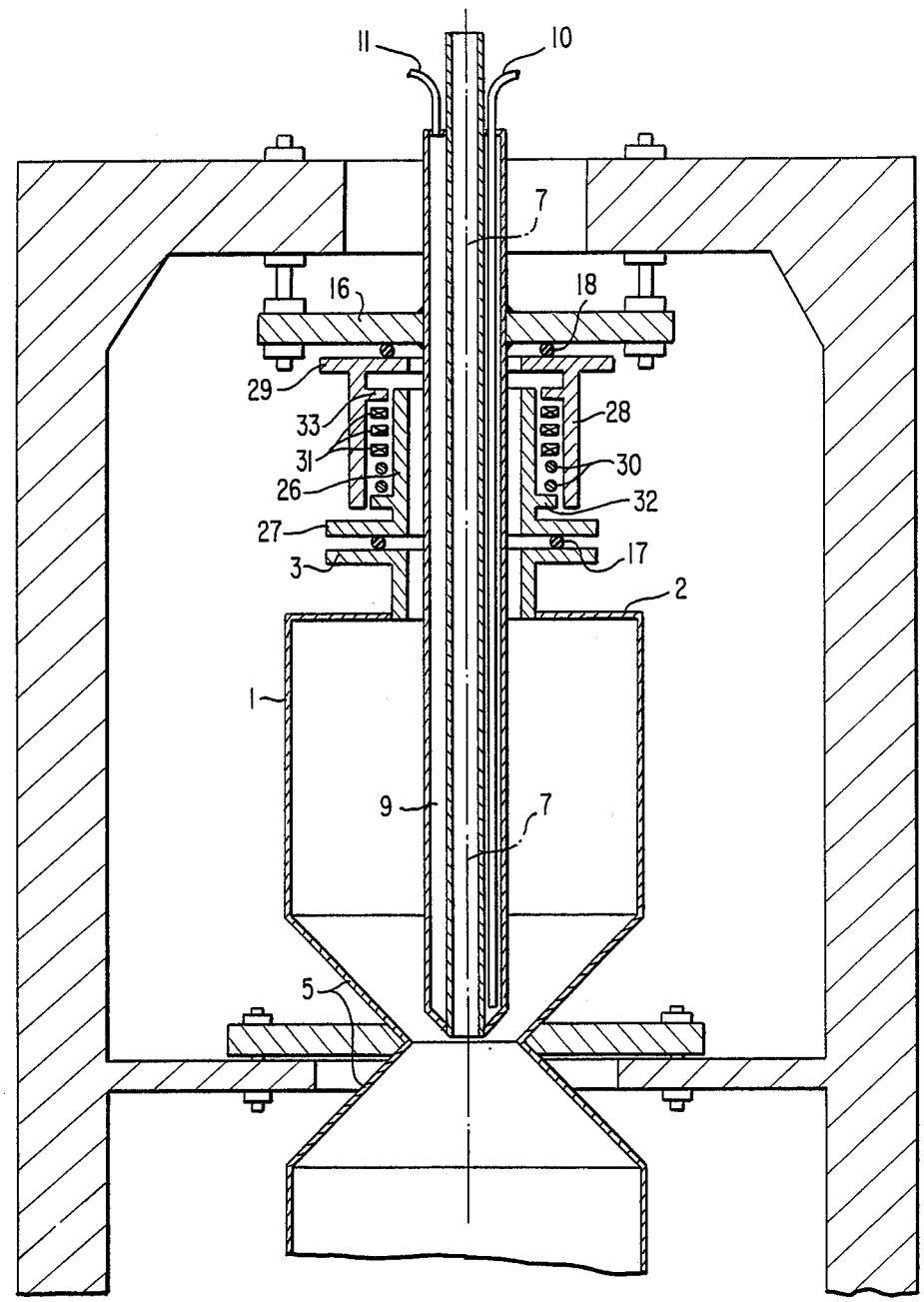
FIG. 3 is a vertical and axial section of a third embodiment of the device whose feed pipe is coaxial with the envelope and whose elastic, fluidtight means able to absorb expansions is a telescopic unit.

According to FIG. 3 comprising the same general elements as in FIG. 1 (i.e., an outer envelope of revolution (1), a convergent-divergent nozzle (5), and a feed pipe (7), the elastic, fluidtight means able to absorb expansions consists of a stuffing box unit comprising a first cylindrical element (26) made solid with the flange (3) of the upper floor (2) by a flange (27), and a second cylindrical element (28) coaxial with the first cylindrical element (26), made solid with the flange ring (16) of the cooling jacket (9) by a flange (29).

The fluidtightness between the two cylindrical elements (26) and (28) that make up the stuffing box unit is provided by a group of springs (30) and fluidtight fittings (31). The springs (30) and the fluidtight fittings (31) rest on stops (32) and (33), respectively. The fluidtightness between the stuffing box unit on the one hand and the flange (3) and the flange ring (16) on the other hand is provided by the seals (17) and (18).

EXAMPLE

A device made according to the prior art has been used industrially for drying an inorganic material in suspension in an aqueous medium by being forced, after drying, to find again the particle size that the inorganic material had before drying.

Figure 4:
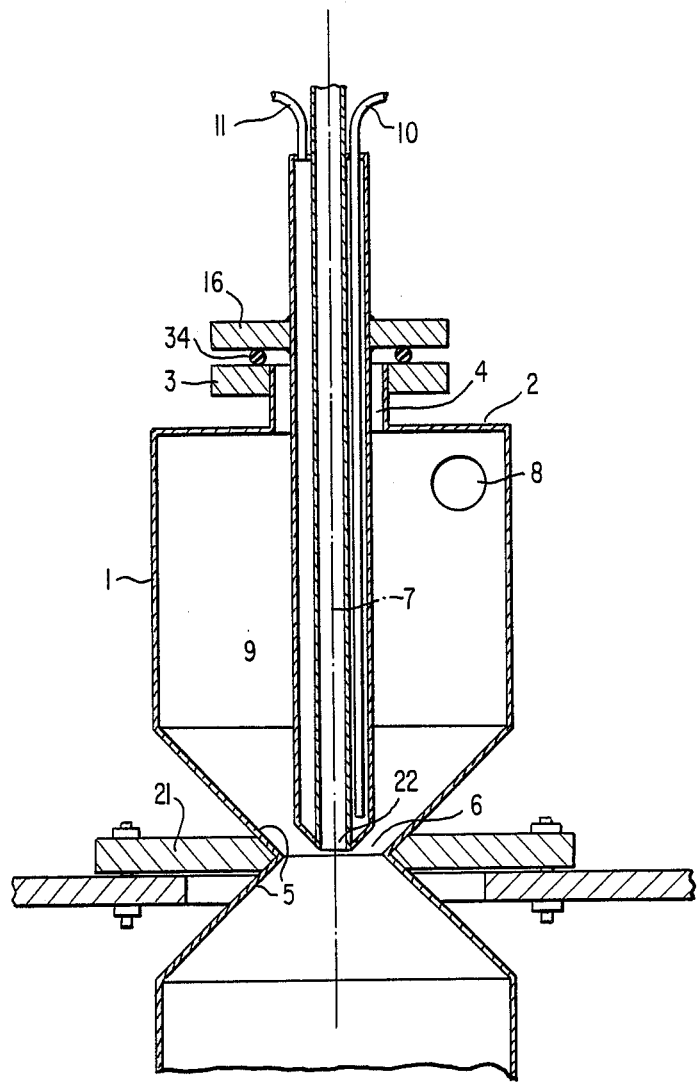
FIG. 4 is a vertical and axial section of a device coming from the prior art, whose feed pipe is coaxial with the outer envelope of revolution and solid with the upper floor of the envelope.

The device according to the prior art illustrated by FIG. 4 was made up of an outer envelope of revolution (1), provided in its upper part with an upper floor (2), having a flange (3) and a recessed space (4) and in its lower part with a convergent-divergent nozzle (5) delimiting a narrow passage (6) in which the gas and hot phase circulated, driven by a helical movement in which a feed pipe (7) having a mouth (22) of the suspension to be treated came out, going through the recessed space (4).

The gas, hot phase was fed by a pipe (8). The feed pipe (7) comprised a cooling jacket (9) in which a cooling fluid was circulating fed by a pipe (10) and leaving by a pipe (11).

The feed pipe (7) was fastened rigidly to the upper floor (2) by a flange (3) and a flange ring (16) between which a seal (34) was placed.

The narrow passage (6) of the convergent-divergent nozzle (5) had a diameter of 310 mm, and the mouth (22) of the feed pipe (7) had a diameter of 233 mm. At the time of the adjustment before operation, the mouth (22) was positioned coaxially in relation to the envelope of revolution (1) and in the plane of the narrow passage (6). The annular play was therefore 38.5 millimeters.

The operating conditions of the device were as follows:

average diameter in microns of the inorganic material: 2 concentration in % of weight of the suspension of inorganic material: 64 mass flow of dry solid in tons/hour: 5 temperature of the fumes at the intake in degrees C: 700 temperature of the dry product leaving, in degrees C: 120

After five months of operating the device continuously during which the formation of agglomerates (6% by weight) was observed, an almost total occlusion of the outlet of the convergent-divergent nozzle was found beyond which 3.2 tons of inorganic materials had accumulated constituting a very dense caking on the walls.

Consequently, a measured vertical deformation of the upper floor (2) equal to 62 mm was observed, causing an upward movement of the feed pipe (7), and an offsetting of the mouth (22) of the feed pipe (7), in relation to the axis of the narrow passage (6) so that, according to a first diameter, a reduction of the annular play could be measured at 20 mm and, according to a second diameter perpendicular to the first, an increase of the annular play to 57 mm could be measured.

After modification of the device of the prior art, to make it conform to the invention according to FIG. 1, (i.e., after the putting in place of an elastic, fluidtight means able to absorb expansions in the form of bellows (12)), the improved device was put back in service, preserving for it the same geometric definitions as in the prior art, in particular those relating to the narrow passage (6) (diameter of 310 mm), and the positioning adjustment of the feed pipe (7) (annular play of 38.5 mm).

The operating conditions of the improved device were kept identical with those used in the prior art, (i.e., the same suspension of inorganic materials to be treated, according to the same conditions of temperatures and flows).

After several years of continuous industrial operation, no deposit of inorganic materials was found at the outlet of the convergent-divergent nozzle (6), or maladjustment of the positioning of the mouth (22) of the feed pipe (7), both in relation to the axis of the narrow passage (6) and its plane: the annular play was still 38.5 mm.

Moreover, during this long period of operation without caking, the device according to the invention made it possible to produce by drying of the aqueous suspension, a powdered inorganic material whose particle size was the same before and after drying: the inorganic material thus produced was almost free of agglomerates (5 ppm by weight of agglomerates) in contrast with the inorganic material produced by the device of the prior art (6% by weight of agglomerates).

Thus, the device according to the invention made it possible, by comparison with the devices of the prior art, to release all the heat stresses of the outer envelope of revolution (1) and of the upper floor (2), to keep the downstream end of the feed pipe (7) in the initial adjustment position in relation to the axis and to the plane of the narrow passage (6) and to assure an excellent fluidtightness for the connection between the feed pipe (7) and the upper floor (2) of the envelope of revolution (1).

I claim:

1. A device for contact mixing a plurality of fluids in different phases, said device comprising:
   (a) an outer envelope of revolution having an outer peripheral wall and being provided in its upper part with an upper floor and in its lower part with a convergent-divergent nozzle defining a narrow passage;
   (b) means for circulating a hot gas in a helical path in said outer envelope of revolution from above said narrow passage through said narrow passage;
   (c) a feed pipe for a second fluid extending into said outer envelope of revolution above said narrow passage, said feed pipe having a mouth located in said narrow passage concentrically to said outer envelope of revolution and spaced inwardly from said outer peripheral wall of said outer envelope of revolution; and
   (d) an elastic, fluidtight means able to absorb expansions due to differences of temperature between said feed pipe and said outer envelope of revolution surrounding said feed pipe exteriorally of said outer envelope of revolution.

2. A device as recited in claim 1 wherein said elastic, fluidtight means is an expansion bellows.

3. A device as recited in claim 1 wherein said elastic, fluidtight means is a telescopic tubular unit containing a plurality of fluidtight fittings and a spring biasing said plurality of fluidtight fittings into tight fitting contact with one another.

4. A device as recited in claim 1 wherein:
   (a) said device further comprises:
      (i) a first flange at the axially upper end of said outer envelope of revolution surrounding said feed pipe and
      (ii) a second flange surrounding said feed pipe and spaced from said first flange at a distance from said outer envelope of revolution and
   (b) said elastic, fluidtight means has a first end bearing against said first flange and a second end bearing against said second flange.

5. A device as recited in claim 1 wherein said feed pipe is provided with an outer cooling means.

6. A device as recited in claim 1 wherein at least the portion of said feed pipe inside said outer envelope of revolution is coaxial with said outer envelope of revolution.

7. A device as recited in claim 1 wherein:
   (a) at least the portion of said feed pipe inside said outer envelope of revolution is curved and
   (b) said feed pipe projects through said peripheral wall of said outer envelope of revolution.

8. A device for contact mixing a plurality of fluids in different phases, said device comprising:
   (a) a housing;
   (b) an envelope contained in said housing and having an outer peripheral wall at least generally symmetrical about a longitudinal axis, said envelope having an upper floor perpendicular to said longitudinal axis, an inlet, a neck projecting from said inlet, an outlet, and a convergent-divergent nozzle defining a narrow passage located between said inlet and said outlet;
   (c) a feed pipe for a first fluid extending from outside said housing through said neck and said inlet into said envelope, said feed pipe having a mouth located in said narrow passage concentrically to said longitudinal axis and spaced inwardly from said outer peripheral wall of said envelope to define an annular passage;
   (d) means for circulating a hot gas in a helical path in said envelope from above said narrow passage through said annular passage;
   (e) a first flange surrounding said neck;
   (f) a second flange solid with said housing and surrounding said feed pipe; and
   (g) an elastic, fluidtight means able to absorb expansion due to differences of temperature between said feed pipe and said envelope surrounding said feed pipe, said elastic, fluidtight means having a first end bearing against said first flange and a second end bearing against said second flange.

9. A device as recited in claim 8 wherein said elastic, fluidtight means is an expansion bellows.

10. A device as recited in claim 8 wherein said elastic, fluidtight means is a telescopic tubular unit containing a plurality of fluidtight fittings and a spring biasing said plurality of fluidtight fittings into tight fitting contact with one another.

11. A device as recited in claim 8 wherein said feed pipe is provided with an outer cooling means.

12. A device as recited in claim 8 wherein at least the portion of said feed pipe inside said envelope is coaxial with said longitudinal axis.

13. A device as recited in claim 8 wherein:
   (a) at least the portion of said feed pipe inside said envelope is curved and
   (b) said feed pipe projects through said peripheral wall of said envelope.

* * * * *

UNITED STATES PATENT AND TRADEMARK OFFICE
CERTIFICATE OF CORRECTION

PATENT NO. : 4,741,624

DATED : May 3, 1988

INVENTOR(S) : Bernard Barroyer

It is certified that error appears in the above-identified patent and that said Letters Patent is hereby corrected as shown below: Title page:

IN THE ABSTRACT

Line 15, after "pipe" insert --(7)--;

Lines 18 and 19, after "feed" insert --pipe (7)--;

Line 19, delete "pipe and".

IN THE SPECIFICATION

Column 2, line 26, change "consisting" to --comprising--.

Column 5, line 4, change "intend" to --intended--;

line 6, after "and" insert --the--;

lines 66 and 67, change "envelope" to --pipe--.

Column 7, line 16, after "mouth" insert --22--;

line 19, after "pipe" insert --(7)--;

line 50, after "(7)" insert --)--.

UNITED STATES PATENT AND TRADEMARK OFFICE
CERTIFICATE OF CORRECTION

PATENT NO. : 4,741,624

DATED : May 3, 1988

INVENTOR(S) : Bernard Barroyer

It is certified that error appears in the above-identified patent and that said Letters Patent is hereby corrected as shown below:

IN THE SPECIFICATION

Column 3, line 24, change "moment" to --movement--.

Column 4, line 67, change "fluidtightness" to --fluidtight--.

Column 6, line 1, change "made" to --make--.

Signed and Sealed this

Twentieth Day of December, 1988

Attest:

DONALD J. QUIGG

*Attesting Officer*    *Commissioner of Patents and Trademarks*